3,060,244
PREPARATION OF GLYCOLS FROM DIENES
AND DIBORANE
Klaus A. Saegebarth, Christiana Hundred, Del., assignor to E. I. du Pont de Nemours and Company, Wilmington, Del., a corporation of Delaware
No Drawing. Filed Nov. 24, 1959, Ser. No. 855,019
1 Claim. (Cl. 260—635)

This invention relates to a novel process for the preparation of diols and more particularly to a process for the preparation of diols from corresponding alkadiene compounds.

This application is a continuation-in-part of my copending application Serial No. 748,159, filed July 14, 1958, now abandoned.

There are many procedures available for the preparation of low molecular weight diols. Some procedures start with aliphatic compounds having reactive substituents (e.g. bimolecular reduction of ketones, cleavage of cyclic ethers, reduction of esters of dibasic acids, etc.). Other procedures hydroxylate olefinic hydrocarbons to give 1,2-glycols. No convenient process exists, however, for preparing non-vicinal diols from unsaturated hydrocarbons, particularly commercially important dienes such as 1,3-butadiene.

It is an object of the present invention to provide a process for the preparation of diols. A further object is to provide a process for the preparation of diols from alkadiene compounds. A still further object is to provide a process for the preparation of diols wherein heterocyclic organoborine-type compounds are used as intermediates. Other objects will appear hereinafter.

These and other objects of this invention are accomplished by the process of preparing a diol which comprises forming an organoborine-type compound by reacting an alkadiene having at least 3 carbon atoms with diborane in the presence of a saturated aliphatic ether in an inert solvent at a temperature greater than about −80° C., with the proviso that the molar ratio of alkadiene to diborane be about 3:1 and the molar ratio of aliphatic ether to diborane be at least about 2:1, isolating the resulting organoborine-type compound; contacting said organoborine in an inert solvent with at least 3 atoms of oxygen for every atom of boron in said organoborine; hydrolizing the resulting oxidized organoborine and recovering the diol thereby obtained.

The novel process of the present invention provides a convenient way in which an alkadiene compound can be converted to the corresponding diol. Basically the process involves the reaction of the alkadiene with diborane so as to form an organoborine-type compound and subsequently oxidizing and hydrolizing this organoborine whereby the diol is produced.

The diborane which is used for reaction with the alkadiene in the novel process of the present invention may be prepared by adding a solution of sodium borohydride to a solution of boron trifluoride etherate. This method of preparation is more particularly described in "Journal of Organic Chemistry," vol. 22, page 1137 (1957). The sodium borohydride and boron trifluoride etherate solution is preferably made using the dimethyl ether of diethylene glycol as a solvent. If desired, tetrahydrofuran or diethyl ether or di-n-butyl ether may be used as the solvent. The use of sodium borohydride is preferred since it is one of the most readily available borohydride reagents; however, other compounds such as potassium borohydride, lithium borohydride, calcium borohydride or magnesium borohydride can be used. Also, the use of boron trifluoride etherate is preferred because here again it is a readily available liquid. However, in general, the etherates of any saturated acyclic low molecular weight aliphatic ether with boron trifluoride may be used. In preparing the diborane the solution of sodium borohydride is added to the solution of boron trifluoride etherate just fast enough to maintain gentle gas evolution. The formation of diborane is quite exothermic. It is to be understood that other methods of preparation can be used for the diborane such as reacting boron trifluoride with lithium aluminum hydride.

The alkadienes which are used for reaction with the diborane in the present process should have at least 3 carbon atoms in the chain with at least 2 carbon-to-carbon double bonds. These compounds may also be referred to as alkenes. Representative compounds include propadiene (allene); 1,2-heptadiene; 2,3-hexadiene; 1,2-butadiene; 1,3 - butadiene; 2 - methyl - 1,3 - butadiene; 2-ethyl-1,3-butadiene; 2-butyl-1,3-butadiene; 2-heptyl-1,3-butadiene; 2-phenyl-1,3-butadiene; 2,3-dimethyl-1,3-butadiene; 2,3 - di - p - tolyl-1,3-butadiene; 1,4-pentadiene; 2-methyl-1,4-pentadiene; 3-methyl-1,4-pentadiene; 2,4 - dimethyl-1,4-pentadiene; 1,5-hexadiene; 2-methyl-1,5-hexadiene; 3-methyl-1,5-hexadiene; 2,5-dimethyl-1,5-hexadiene; 3,4-dimethyl-1,5-hexadiene; 3,4-diethyl-1,5-hexadiene; 2-isopropyl-5-methyl-1,5-hexadiene; and 3-methyl-4-phenyl-1,5-hexadiene. In general any alkadiene may be used wherein the substituents are not reactive with the diborane, i.e., not reduced by diborane under the conditions of the reaction. Substituents which should be avoided include aldehydes, ketones, lactones, azo groups, epoxides, cyclopropane rings, nitriles and groups bearing Zerewitinoff active hydrogen atoms.

In carrying out the process of the present invention the diborane is introduced into a reaction vessel where it contacts the alkadiene which is generally dissolved in an inert solvent. The product resulting from this reaction may be broadly referred to as an organoborine-type compound. When an alkadiene having 2 carbon-to-carbon double bonds which are not on adjacent carbon atoms is used, the resulting organoborine-type compound will be of the type more particularly described and claimed in U.S. Patent 3,008,997. In the instance where the carbon-to-carbon double bonds are on adjacent carbon atoms, the resulting organoborine compound will be of the type more particularly described and claimed in U.S. Patent 3,014,075.

When the diborane is reacted with the alkadiene it is necessary that an inert atmosphere be maintained since diborane may burst into flame or explode when contacted with air. Highly purified argon is satisfactory as an inert atmosphere, but other equally inert gases such as highly purified nitrogen may be used. Before the diborane is introduced into the reaction vessel all traces of air are thoroughly swept from the reaction system and a positive pressure is maintained by inflow of the inert gas until all the alkadiene and diborane have reacted and any residual diborane has been removed from the system.

The reaction between the diborane and the alkadiene must be carried out in the presence of an aliphatic ether. Essentially any saturated aliphatic ether may be used which satisfies all of the following requirements: (1) it can coordinate with diborane; (2) it has no substituents which will react with diborane under the reaction conditions employed for making the organoborine compound; (3) it is stable toward cleavage under these reaction conditions. In order to facilitate the isolation of the organoborine compound, it is preferred that the ether compound be relatively volatile (have a boiling point below about 150° C. at atmospheric pressure). The preferred ethers are dialkyl ethers such as diethyl ether (B.P. 34.6° at 760 mm. Hg); diisopropyl ether (B.P. 68.3° at 760 mm. Hg); and di-n-butyl ether (B.P. 142.4° C. at 760 mm. Hg). Certain cyclic alkylene ethers may be used such as tetrahydrofuran (B.P. 65–6° C. at 760 mm. Hg); tetrahydropyran (B.P. 88° C. at 760 mm. Hg); and 1,3-dioxane (B.P. 105–6° C. at 760 mm. Hg). At least 2 moles of the aliphatic ether is employed for each mole of diborane used because the conversion of the alkadiene to the organoborine compound is much reduced when a lower proportion is present.

In addition to the saturated aliphatic ether, an inert solvent such as a saturated aliphatic hydrocarbon solvent may be used as a diluent for the reaction of the diborane with the alkadiene. Any solvent may be used which is inert to the reactants and which boils low enough to be easily removed after the organoborine has formed. Representative solvents include pentane, which is preferred, cyclohexane, isooctane and n-decane. If desired, the saturated aliphatic ethers described above for the reaction of the diborane with the alkadiene may be employed. In this instance the ether serves both as a promoter and a solvent. Other ethers which may be used include the dimethyl ether or diethyl ether of diethylene glycol. The solvent, in order that it not interfere with formation of the organoborine, should be free of any groups which may be reduced by diborane under the conditions of the reaction.

About 3 moles of the alkadiene should be used for every mole of the diborane. In general this reaction is carried out at atmospheric pressure at a temperature not far above the boiling point of the alkadiene. It is to be understood that the process may be operated at superatmospheric pressure. The temperatures at which satisfactory results can be achieved range from about −80° C. to about 100° C. It is not convenient to operate at temperatures below −80° C.; excessive cooling facilities are required; there is a tendency for the reaction mixture to thicken and solidify. Temperatures should be kept below 100° C. to avoid thermal decomposition of diborane itself. After the diborane-alkadiene reaction is completed the resulting organoborine is obtained by concentrating the solution obtained under vacuum.

After the organoborine-type compound is recovered it is then converted to the diol by oxidation and hydrolysis. Each atom of boron present in the organoborine is oxidized with 3 atoms of oxygen (or its equivalent provided by an oxygen-bearing oxidizing agent). In other words, 3 moles of molecular oxygen (or its equivalent) is provided for every mole of diborane reacted to form the organoborine. The intermediate obtained may then be hydrolized to the diol. This oxidation and hydrolysis may be conveniently carried out in one stage by introducing 30% aqueous hydrogen peroxide to a basic ethanolic solution of the organoborine. Alternatively, air or oxygen can be introduced into an anhydrous solution of the organoborine in a solvent that is not readily oxidized, such as tertiary butyl alcohol or pentane. Water is then added after the introduction of air or oxygen has been completed. The air oxidation may also be carried out at ambient temperature since it is very exothermic and can be controlled by the rate of air or oxygen input. The hydrolysis can then be carried out by using at least 3 moles of water for each atom of boron present in the organoborine. If desired, the air oxidation step may be conducted with either organic or inorganic peroxy acids.

When the oxidation and hydrolysis is carried out in one step, a 30% aqueous hydrogen peroxide is added to a solution of the organoborine in ethanol containing about 5–10 percent by weight of sodium hydroxide. About 2 moles of base are present for every mole of organoborine. Since the oxidation is very exothermic, the peroxide solution is added at a rate just sufficient to maintain reflux. A slight excess of peroxide may be required before the reaction mixture displays a positive starch iodide test. When enough peroxide has been added the mixture is cooled and decanted from the precipitated sodium borate. The mixture is neutralized with acetic acid, dried, and distilled to isolate the product diol. The preparation of the diol corresponding to the alkadiene which is used to prepare the organoborine is more particularly illustrated in the examples.

The process of the present invention provides a convenient way in which an alkadiene compound can be converted to the corresponding diol. Thus this process provides a way in which relatively pure bifunctional hydroxy compounds may be prepared and it will be readily appreciated that these diols have a wide variety of uses. They are solvents for essential oils, resins, dyestuffs and gums. They can be employed as components for brake fluids and as heat transfer liquids. They are blending agents and coupling agents for cutting oils and dry-cleaning soaps. Esters of these diols and suitable mono-basic acids are plasticizers for thermoplastic resins such as cellulose nitrate, polyvinyl chloride, polyvinyl esters, polyacrylates, and polymethacrylates. They can be reacted with dicarboxylic acids to give polyester resins suitable for use as protective coatings. Polyurethanes, e.g. the reaction product of 1,4-butanediol and 1,6-hexanediisocyanate, can be made which are of value for synthetic fibers.

The following examples will better illustrate the nature of the present invention; however, the invention is not intended to be limited to these examples. Parts are by weight unless otherwise indicated.

*Example 1*

Two reaction vessels are used. Diborane is generated in the first and contacted with the alkadiene in the second. Argon gas is swept through both vessels to displace air as completely as possible before the reaction is begun. A continual argon sweep is maintained during the reaction to maintain a positive pressure in the system. The exit vent of the second reactor is connected to a bubbler tower containing acetone; any diborane displaced from the second reactor is destroyed as it emerges from the bubbler tube below the surface of the acetone. After the reaction has been completed, argon is swept through the reaction vessels for several hours to remove residual diborane.

Into the first vessel are poured 50 milliliters of the dimethyl ether of diethylene glycol and 25 milliliters of boron trifluoride:diethylether complex. Into the second vessel are introduced with agitation 100 milliliters of anhydrous ether and 150 milliliters of anhydrous pentane. External cooling is applied and the temperature of the well-stirred solution is lowered to about 2° C. Diborane is generated by adding 240 milliliters of a 0.75 M sodium borohydride solution in the dimethyl ether of diethylene glycol to the first vessel with agitation over a one-hour period. The diborane is swept into the second vessel where it is admitted by a bubbler outlet positioned below the surface of the solution contained therein. When the diborane begins to enter, 25 milliliters of 1,3-butadiene is added with stirring to the chilled solution in the second flask in about 6 minutes. About 15 milliliters of the sodium borohydride solution have been used at this point; the remaining 225 milliliters is subsequently introduced in about 54 minutes while agitation is continually maintained and the temperature in the second vessel is kept between about 2 to 10.5° C. After standing at room temperature for about 16 hours, the solution containing the organoborine is removed from the second vessel and concentrated under vacuum to yield 15.7 grams of a clear, colorless, oily liquid which boils at 113–115° C. (9 mm. Hg) and bursts into a green flame on exposure to air. The organoborine is 1,4-bis(1-boracylopentyl)butane.

This organoborine is used to prepare 1,4-butanediol by the following procedure. A reaction vessel is employed equipped with an agitator and a condenser. 6.4 grams of sodium hydroxide is dissolved with stirring in 150 milliliters of ethyl alcohol. The organoborine prepared above is then dissolved with agitation in this basic solution. During a 5-hour period 70 milliliters of 30% hydrogen peroxide is added cautiously with stirring. The heat evolved brings the mixture to reflux. When the addition is finished, the mixture is allow to cool. A pasty white solid precipitates. The clear supernatant liquid is decanted. The precipitate is washed three times with 75 milliliters of a 50/50 diethyl ether-chloroform mixture. The combined organic phases, which display a pH of about 7.5, are neutralized with acetic acid and substantially dried over magnesium sulfate. The solvent is allowed to evaporate and the clear colorless viscous residue is fractionally distilled. 14.05 grams of 1,4-butanediol is obtained melting at 15.5–17° C. and boiling at 99–101° C. (2.5–3.0 mm. Hg). Its $n_D^{20}$ is 1.4430.

0.5 gram of the 1,4-butanediol and 1.2 grams of phenyl isocyanate are mixed and heated on a steam bath for several minutes. White crystals separate on cooling. After recrystallization from benzene they melt at 182–183° C. alone or when mixed with an authentic sample of the bisphenylurethane of 1,4-butanediol.

*Example 2*

1,4 - bis(1 - bora - 3 - methylcyclopentyl) - 2 - methylbutane is made from isoprene by a procedure similar to that described in Example 1 for 1,4-bis(1-boracyclopentyl)butane except that the diborane is reacted with the diene at 20 to 28° C. instead of 2 to 10.5° C.

20.4 grams of isoprene is reacted with 2.77 grams of diborane generated by mixing 240 milliliters of the 0.75 M sodium borohydride solution and the solution containing 25 milliliters of boron trifluoride:ether complex. 14.7 grams of the liquid organoborine is obtained.

This organoborine is dissolved in 100 milliliters of ethanol containing 6.4 grams of sodium hydroxide. Over a 3-hour period 45 milliliters of 30% hydrogen peroxide is introduced with stirring. 12.5 grams of 2-methyl-1,4-butanediol B.P. 107–109° C. (4.5 mm. Hg) is isolated by a procedure similar to that described in Example 1.

*Example 3*

The apparatus and the protective atmosphere of argon described in Example 1 are used here.

Over a period of about 40 minutes 16.2 grams of 1,3-butadiene and about 2.77 grams of diborane are introduced with stirring into 200 milliliters of tetrahydrofuran maintained at a temperature between 2 to 7° C. The diborane is generated during this reaction by adding a solution of 5.57 grams of sodium borohydride in 125 milliliters of the dimethyl ether of diethylene glycol with stirring to a solution of 28.4 grams of boron trifluoride:diethyl ether complex in 50 milliliters of the dimethyl ether of diethylene glycol.

The tetrahydrofuran solution is allowed to stand at room temperature for 16 hours. It is then concentrated under vacuum to yield 15.5 grams of 1,4-bis(1-boracyclopentyl)butane. The clear, colorless oil fumes violently on exposure to air and gives a positive flame test (green color) for boron.

The above organoborine is dissolved with stirring in 100 milliliters of an ethanol solution containing 6.4 grams of sodium hydroxide. Then 60 milliliters of 30% aqueous hydrogen peroxide is introduced over a 1.5-hour period at a rate sufficient to maintain gentle reflux. The mixture displays a negative starch iodide test until 10 additional milliliters of 30% aqueous hydrogen peroxide is added. The reaction mixture is allowed to cool. A white pasty water-soluble solid separates. The supernatant liquid is decanted, the solid is thrice washed with 75 ml. portions of ether, the combined organic layers (pH=7.5) are neutralized with acetic acid and dried over anhydrous magnesium sulfate. The solvent is removed to yield 13.5 grams of 1,4-butanediol, B.P. 110–112° C. (6 mm. Hg), melting at 14.5–17° C.

*Example 4*

1,4 - bis(1-bora-3,4-dimethylcyclopentyl)-2,3-dimethylbutane is made from 2,3-dimethyl-1,3-butadiene by a procedure similar to that described in Example 1 for 1,4-bis(1-boracyclopentyl)butane except that the diborane is reacted with the diene at 14 to 30.5° C. instead of 2 to 10.5° C.

24.6 grams of 2,3-dimethyl-1,3-butadiene is reacted with 2.77 grams of diborane generated by mixing 200 milliliters of a 1.0 M sodium borohydride solution and 23.1 grams boron trifluoride ether complex in 50 milliliters of the dimethyl ether of diethylene glycol. 27.5 grams of the organoborine is obtained B.P. 109–110° C. (0.9 mm. Hg). It is a colorless mobile liquid which fumes when exposed to air and burns with a green flame.

This organoborine is dissolved in 125 milliliters of ethanol containing 8 grams of sodium hydroxide. Over a one-hour period 81.6 grams of 30% hydrogen peroxide is introduced with stirring. 18.1 grams of 2,3-dimethyl-1,4-butanediol is isolated, B.P. 122–124° C. (10 mm.). The $n_D^{20}$ is 1.4522–1.4542.

*Example 5*

1,6-bis(1-boracycloheptyl)hexane is prepared from biallyl, also known at 1,5-hexadiene by a procedure similar to that described in Example 1 for 1,4-bis(1-boracyclopentyl)butane except that the diborane is reacted with the diene at 22.5–30.5° C. instead of 2 to 10.5° C.

24.6 grams of biallyl is reacted with 2.77 grams of diborane generated by mixing 180 milliliters of 1.0 M sodium borohydride solution with 23.4 grams of boron trifluoride: diethyl ether complex in 50 milliliters of the dimethyl ether of diethylene glycol. 27.2 grams of the organoborine is obtained as a pale yellow liquid, B.P. 132° C. (1 mm. Hg).

27.4 grams of this organoborine is dissolved in 125 milliliters of ethanol containing 8.0 grams of sodium hydroxide. Over a 4.5-hour period 81.6 grams of 30% hydrogen peroxide solution is introduced with stirring. 17.8 grams of 1,6-hexanediol B.P. 114–118° C. (3 mm. Hg) is isolated by a procedure similar to that described in Example 1.

*Example 6*

1,4-bis(1-bora-3-phenylcyclopentyl)-2-phenylbutane is made from 2-phenyl-1,3-butadiene by a procedure similar to that described in Example 1 for 1,4-bis(1-boracyclopentyl)butane except that the diborane is reacted with the diene at 18 to 28° C. instead of 2 to 10.5° C. and nitrogen is used in place of argon.

13 grams of 2-phenyl-1,3-butadiene is reacted with 0.87 gram of diborane generated by mixing 70 milliliters of a 1.0 M sodium borohydride solution and 12 milliliters of borontrifluoride:diethyl ether complex in 10 milliliters of the dimethyl ether of diethylene glycol. 15.2 grams of the organoborine is obtained. It is a low-melting solid which readily dissolves in common organic solvents (e.g. benzene, pentane, diethylether, and ethanol) and burns with a green flame.

15.2 grams of this organoborine is dissolved in 42 milliliters of ethanol containing 2.7 grams of sodium hydroxide. Over a half-hour period 27.2 grams of 30% aqueous hydrogen peroxide is introduced with stirring; 5.44 more grams of peroxide solution is finally added to get the mixture to display a positive starch iodide test. 9.6 grams of 2-phenyl-1,4-butanediol, B.P. 85–87° C. (1 mm. Hg), M.P. 69–70° C. is obtained after decantation of the solution from the white precipitate which forms, washing of the precipitate with ether, combination of the ether with the solution, drying of the combined organic layers over anhydrous $MgSO_4$, and concentration under vacuum.

*Example 7*

1,4-bis(1 - bora-3,4-diphenylcyclopentyl)-2,3-diphenylbutane is made from 2,3-diphenyl-1,3-butadiene by a procedure similar to that described in Example 1 for 1,4-bis(1-boracyclopentyl)butane except that the diborane is reacted with the diene at 21–30.5° C. instead of 2 to 10.5° C. and nitrogen is used instead of argon.

20.6 grams of 2,3-diphenyl-1,3-butadiene is reacted with 0.87 gram of diborane generated by mixing 70 milliliters of 1.0 M sodium borohydride solution and 12 milliliters of borontrifluoride diethyl ether complex in 10 milliliters of diethylene glycol. 20.0 grams of the organoborine is obtained. It is a very viscous syrup which solidifies on cooling. It is soluble in common organic solvents (e.g. ether, pentane, benzene, and ethanol), fumes slightly in air, and burns with a green flame.

20.6 grams of the organoborine is dissolved in 42 milliliters of ethanol containing 2.7 grams of sodium hydroxide. 27.2 grams of 30% aqueous hydrogen peroxide is introduced with stirring over a half-hour period; an additional 5 milliliters is required to get a positive starch iodide test. The ethanolic solution is decanted from the white precipitate and concentrated under vacuum. The concentrate residue is taken up in 100 milliliters of water and the solution is thrice extracted with 100-milliliter portions of chloroform. The chloroform extracts are combined, dried over anhydrous sodium sulfate, and concentrated to give a sticky syrup which when crystallized from benzene yields 11.6 grams of 2,3-diphenyl-1,4-butanediol, M.P. 136.5–137.7° C.

*Example 8*

12 grams (0.3 mol) of propadiene (allene) is contacted in the presence of 100 milliliters of anhydrous ether and 150 milliliters of anhydrous pentane with the diborane separately generated by adding 190 milliliters of 1.0 M sodium borohydride solution to a mixture of 30 milliliters of boron trifluoride:diethyl ether complex and 50 milliliters of the dimethyl ether of diethylene glycol. The temperature of the reaction mixture rises from 0 to 5° C. during the run. Removal of the solvent under vacuum gives 8 grams of a waxy organoborine polymer which fumes in air and displays a positive test for boron (green flame).

This organoborine polymer is treated with 70 milliliters of ethyl alcohol containing 4.4 grams of sodium hydroxide. Over a 1.5-hour period 43 milliliters of 30% hydrogen peroxide is introduced with stirring. 9 grams of trimethylene glycol is isolated boiling at 105–106.5° C. (10 mm. Hg).

As many widely different embodiments of this invention may be made without departing from the spirit and scope thereof, it is to be understood that this invention is not limited to the specific embodiments thereof except as defined in the appended claim.

What is claimed is:

A process for preparing 1,4-butanediol which comprises forming 1,4-bis(1-boracyclopentyl)butane by reacting 1,3-butadiene with diborane in the presence of a saturated aliphatic ether selected from the group consisting of dialkyl ethers, tetrahydrofuran, tetrahydropyran and 1,3-dioxane, in an inert solvent selected from the group consisting of pentane, cyclohexane, isooctane, n-decane, the dimethylether of diethylene glycol and the diethylether of diethylene glycol, at a temperature of from about −80° C. to 100° C., with the proviso that the molar ratio of 1,3-butadiene to diborane be about 3:1 and the molar ratio of said aliphatic ether to diborane be at least about 2:1, isolating the resulting 1,4-bis(1-boracyclopentyl)butane and forming a solution thereof in ethanol containing about 2 moles of sodium hydroxide per mole of said 1,4-bis-(1-boracyclopentyl) butane; contacting said basic ethanolic solution with a 30% aqueous hydrogen peroxide solution so as to provide at least 3 moles of oxygen for every mole of diborane used in the preparation of said 1,4-bis-(1-boracyclopentyl)butane; and recovering the 1,4-butanediol thereby obtained.

References Cited in the file of this patent

Johnson et al.: J. Am. Chem. Soc., vol. 60, pages 121–4 (1938).

Brown et al.: J. Org. Chem., vol. 22, pages 1136–7 (1957). (Copies of above in library.)